Patented Apr. 2, 1929.

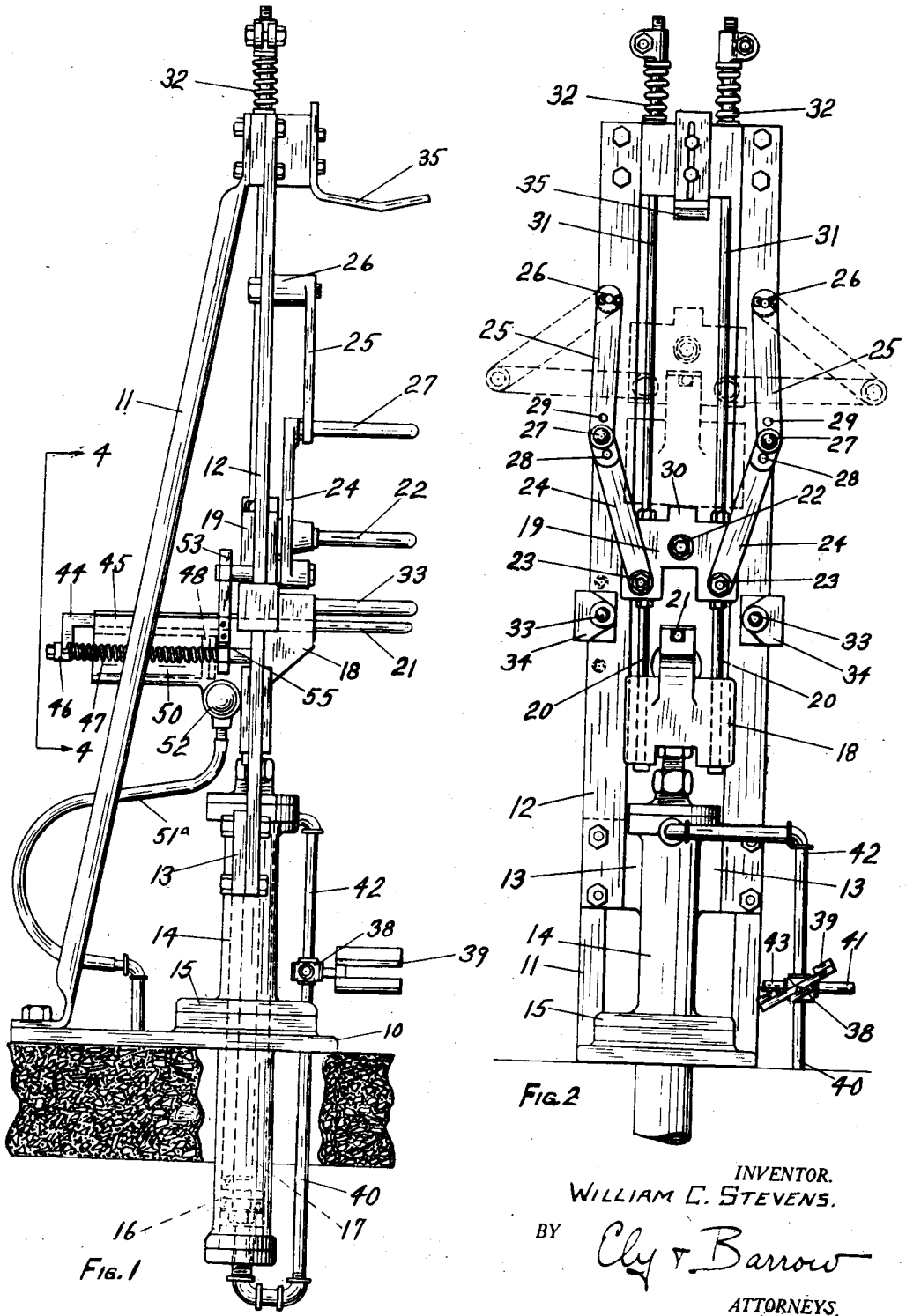

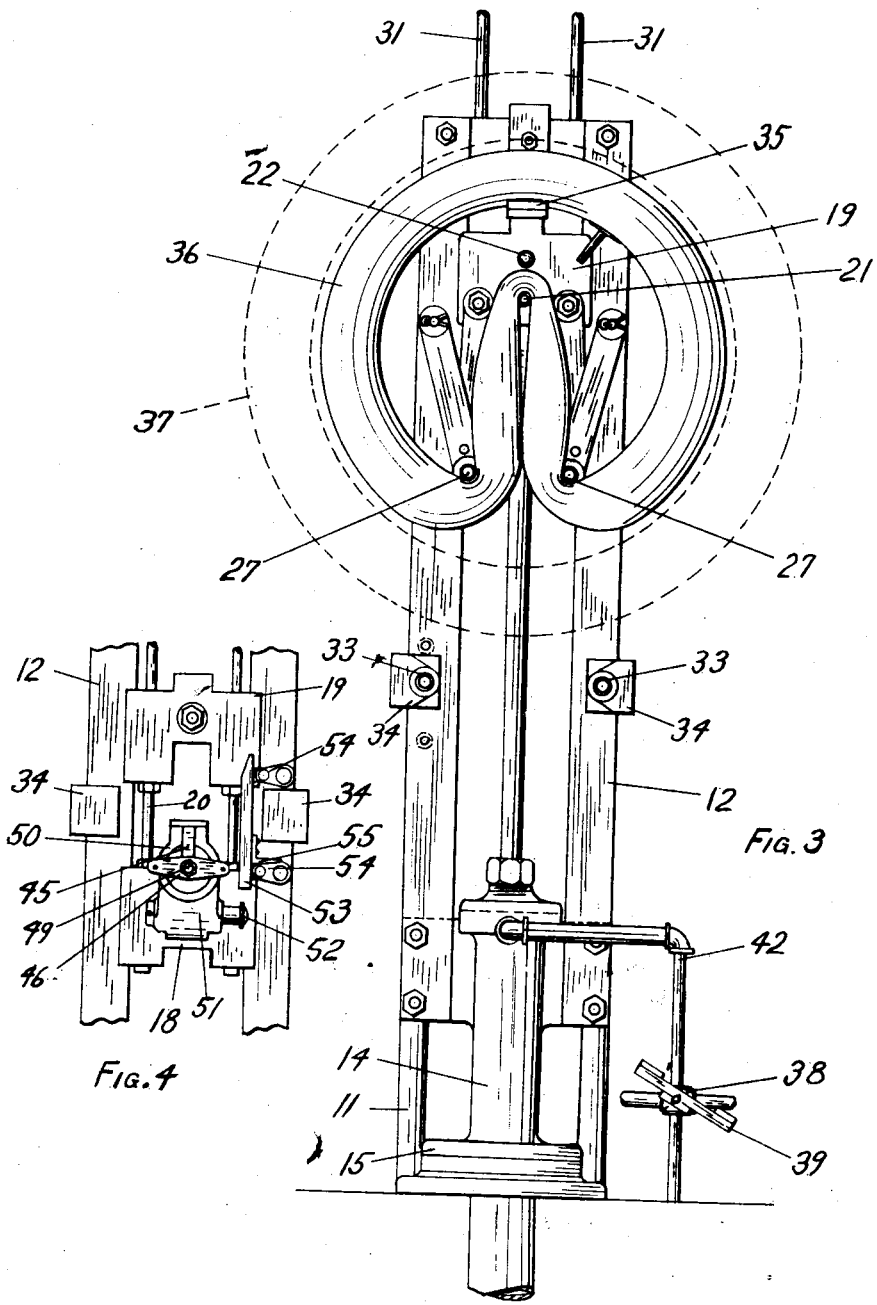

1,707,646

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

AIR-BAG-INSERTING MACHINE.

Application filed December 11, 1926. Serial No. 154,086.

This invention relates to machines for inserting air bags into pneumatic tire casings prior to vulcanization of the latter.

The object of the invention is to provide apparatus for folding an air bag to substantially circular form to decrease its peripheral diameter to approximately the bead diameter of a tire casing in order that the bag may be easily inserted therein. Another object is to provide means for flattening a portion of the air bag prior to folding it at such flattened portion. A further object is to provide means for releasing the air bag after a tire casing has been positioned thereover, to allow the air bag to resume its normal shape and force it into the casing.

These and other objects are obtained by the device illustrated in the accompanying drawings and described below. It is to be understood that the invention is not limited to the specific form thereof disclosed herein.

Of the accompanying drawings:

Figure 1 is a side elevation of a device embodying the principles of the invention;

Figure 2 is a front elevation thereof;

Figure 3 is a front elevation of the device illustrating the parts in position to fold an air bag; and Figure 4 is a rear elevational detail of the device as viewed in the direction of the line 4—4 of Figure 1.

Referring more particularly to the drawings, base 10 of the machine is secured to the floor and has attached thereto braces 11, 11 supporting a frame 12 at its upper end. The lower end of the frame is carried by cross-arms 13, 13, projecting from a cylinder 14, said cylinder having also a central flange 15 whereby it may be attached to base 10. The lower end of the cylinder may project below the floor as shown in order to bring the upper part of the machine conveniently within range of the workman. Cylinder 14 is provided with a piston 16 connected by piston rod 17 to lower crosshead 18 which is in turn connected to upper crosshead 19 by a lost motion connection comprising rods 20, 20. The crossheads are adapted to reciprocate vertically the inner margins of frame 12 serving as tracks to maintain said crossheads in alignment. The crossheads have projecting therefrom pins 21 and 22, respectively, and upper crosshead 19 has pivoted thereto at 23, 23 a pair of links 24, 24. A second pair of links 25, 25 are hinged to links 24, 24 at one end and at the other end are pivoted to frame 12 at 26, 26 thus forming a pair of toggle joints. Projecting pins 27, 27 are carried by links 24, 24 and 25, 25 at their hinged joints and may be adjusted by being positioned in apertures 28, 28 or 29, 29 to hinge the links at these points when different sized bags are to be folded. Upward motion of crosshead 19 is limited by abutment of its projecting portion 30 against the top of frame 12 and downward motion is limited by rods 31, 31 attached to crosshead 19 and passing through frame 12, the upper ends of said rods carrying springs 32, 32 acting as shock absorbers. Pins 33, 33 are adjustably attached to frame 12 by clamps 34, 34, and adjustable arm 35 serves to support the air bag 36 before it is folded and also to support the casing 37 while the bag is being inserted.

The device is controlled by a four-way valve 38 operated by pedals 39, the valve serving, in one position, to connect the bottom of cylinder 14 by pipe 40 to a fluid pressure supply line 41 and connect the top of cylinder 14 by pipe 42 to an exhaust line 43, and in the other position to reverse the connections. Pin 21 is constructed to reciprocate so that it may be withdrawn from under the air bag as the latter is inserted into the tire casing. The pin has a prolonged shaft portion 44 slideable in a housing 45 attached to crosshead 18 and said shaft portion terminates in a downwardly turned angle member 45 to which is attached a cross-arm 46. A pair of tension springs 47 are connected to the ends of the cross-arm 46 and to crosshead 18 and serve to maintain pin 21 in its normally forwardly projecting position. To retract the pin, a piston 48 connected to cross-arm 46 by a piston rod 49 is reciprocated by fluid pressure within a cylinder 50 integrally attached to crosshead 18. This pressure is controlled by a slide valve 51 connected to a flexible pressure line 51ª and attached to cylinder 50, the end of the valve stem 52 engaging a pivoted cam track 53 carried by links 54, 54. When crosshead 18 moves on its upward stroke valve stem 52 swings cam track 53 upward and outward, the valve remaining closed. The cam track then returns to its original position, downward movement thereof being limited by a stop member 55, and as crosshead 18 descends, valve stem 52 is forced inwardly by engaging tapered portion 56 of the cam track. The valve is held open to keep pressure in the cylinder and the pin 21 retracted until the cam track is passed, when the valve stem will be forced out by a compression spring (not shown) to close the valve.

In operation an air bag is placed over arm 35, the bag resting on pins 33, 33 and 21, and pins 27, 27 and 22 engaging the inner periphery of the bag, the parts of the machine being in the position shown in Figures 1 and 2. Pedal 39 is then pressed to admit pressure to the lower end of the cylinder. Crosshead 18 is forced up to take up lost motion until it engages crosshead 19, flattening the air bag between pins 21 and 22 during this movement. Crosshead 18 continues moving upward, forcing ahead of it crossshead 19 and spreading the toggle joints to a position shown in dotted lines in Figure 2. Then as the crossheads continue upward, the lower portion of the bag between pins 27, 27 is folded inward by pin 21 and pins 27, 27 are drawn together so that the outer portion of the air bag assumes a substantially annular form of a diameter equal to or less than the bead diameter of the tire casing into which it is to be inserted. The machine and the bag are then in the position shown in Figure 3 of the drawings.

A tire casing, indicated by the dotted lines in Figure 3 is next placed over the bag and pedal 39 operated to exhaust the bottom of the cylinder and admit fluid pressure to the top to draw the crossheads down. The bag then begins to unfold and is forced into the casing by pins 27, 27 as the latter move to their outermost position again. Pin 21 is next retracted by the mechanism already described and pin 22 presses the lower portion of the bag into the casing, this operation being aided by the tendency of the resilient bag to return to its annular form.

The flattening of the bag prior to folding, permits very large and heavy air bags to be readily folded while drawing the folded bag into circular form facilitates the insertion of bags having large transverse sectional dimensions and a relatively small bead diameter.

Modifications of the invention may be resorted to, as will be understood, without departing from the spirit thereof or the scope of the appended claims.

What is claimed is:

1. An air bag inserter comprising a frame having adjustably mounted thereon a plurality of members for supporting an air bag, upper and lower crossheads slidably mounted on the frame and joined to each other by a lost motion connection, a double-acting fluid pressure operated cylinder for reciprocating the crossheads, a pin carried by each crosshead and respectively engaging the inner and outer peripheries of the air bag for flattening the same between the pins as the lost motion is taken up between the crossheads and for folding the bag inwardly at the flattened portion as the crossheads reciprocate upwardly, a pair of toggles comprising hinged links pivoted to the frame and to the upper crosshead, a pin projecting from the hinged portions of each toggle and adapted to separate as the crossheads ascend and to engage the inner periphery of the air bag to grip the same, the latter pins being further adapted to come together again as the crossheads reciprocate to their upper limit to draw the ends of the folded portion of the air bag together and form the remainder thereof into a substantially annular shape of a diameter approximately equal to the bead diameter of the tire casing into which the air bag is to be inserted, the motion of all of the pins being reversible as the crossheads again descend to force the air bag into a tire casing placed thereover, the pin in the lower crosshead being retractable to clear the bottom of the bag, an air cylinder carried by the lower crosshead for retracting the latter pin, a valve for controlling the cylinder, and a pivoted cam track mounted on the frame for opening the valve on the down stroke of the crossheads.

2. An air bag inserter comprising a frame for supporting an air bag, upper and lower crossheads slidably mounted on the frame and joined to each other by a lost motion connection, means for reciprocating the crossheads, a pin carried by each crosshead and respectively engaging the inner and outer peripheries of the air bag for flattening the same between the pins as the lost motion is taken up between the crossheads and for folding the bag inwardly at the flattened portion as the crossheads reciprocate upwardly, a pair of toggles comprising hinged links pivoted to the frame and to the upper crosshead, a pin projecting from the hinged portions of each toggle and adapted to separate as the crossheads ascend and to engage the inner periphery of the air bag to grip the same, the latter pins being further adapted to come together again as the crossheads reciprocate to their upper limit to draw the ends of the folded portion of the air bag together and form the remainder thereof into a substantially annular shape of a diameter approximately equal to the bead diameter of the tire casing into which the air bag is to be inserted, the motion of all of the pins being reversible as the crossheads again descend to force the air bag into a tire casing placed thereover, and means for retracting the pin in the lower crosshead as the lower portion of the air bag is forced into the casing.

3. An air bag inserter comprising a frame for supporting an air bag, upper and lower crossheads slidably mounted on the frame and joined to each other by a lost motion connection, means for reciprocating the crossheads, a pin carried by each crosshead and respectively engaging the inner and outer peripheries of the air bag for flattening the same between the pins as the lost motion is taken up between the crossheads and for folding the bag inwardly at the flattened portion as the cross-heads reciprocate upwardly, a pair of toggles comprising hinged links pivoted to the frame and to the upper crosshead, a pin projecting from the hinged portions of each toggle and adapted to separate as the crossheads ascend and to engage the inner periphery of the air bag to grip the same, the latter pins being further adapted to come together again as the crossheads reciprocate to their upper limit to draw the ends of the folded portion of the air bag together and form the remainder thereof into a substantially annular shape, and means to force the air bag into a tire casing placed thereover.

4. An air bag inserter comprising a frame for supporting an air bag, upper and lower crossheads slidably mounted on the frame and joined to each other by a lost motion connection, means for reciprocating the crossheads, a pin carried by each crosshead and respectively engaging the inner and outer peripheries of the air bag for flattening the same between the pins as the lost motion is taken up between the crossheads and for folding the bag inwardly at the flattened portion as the crossheads reciprocate upwardly, spaced means adapted to engage the inner periphery of the air bag to grip the same, the latter means being further adapted to come together again as the crossheads reciprocate to their upper limit to draw the ends of the folded portion of the air bag together and form the remainder thereof into a substantially annular shape, and means to force the air bag into a tire casing placed thereover.

5. An air bag inserter comprising a frame for supporting an air bag, upper and lower separately movable crossheads slidably mounted on the frame, a pin carried by each crosshead for flattening a portion of the air bag, means for reciprocating the crossheads, means for folding the bag inwardly at the flattened portion as the crossheads reciprocate upwardly, a pair of toggles comprising hinged links pivoted to the frame and to the upper crosshead, a pin projecting from the hinged portions of each toggle and adapted to separate as the crossheads ascend and to engage the inner periphery of the air bag to grip the same, the latter pins being further adapted to come together again as the crossheads reciprocate to their upper limit to draw the ends of the folded portion of the air bag together and form the remainder thereof into a substantially annular shape, and means to force the air bag into a tire casing placed thereover.

6. An air bag inserter comprising a frame for supporting an air bag, upper and lower separately movable crossheads slidably mounted on the frame, a pin carried by each crosshead for flattening a portion of the air bag, means for reciprocating the crossheads, means for folding the bag inwardly, spaced means adapted to engage the inner periphery of the air bag to grip the same, the latter means being further adapted to come together again as the crossheads reciprocate to their upper limit to draw the ends of the folded portion of the air bag together and form the remainder thereof into a substantially annular shape, and means to force the air bag into a tire casing placed thereover.

7. An air bag inserter comprising a frame for supporting an air bag, upper and lower crossheads slidably mounted on the frame and joined to each other by a lost motion connection, for reciprocating the crossheads, a pin carried by each crosshead and respectively engaging the inner and outer peripheries of the air bag for flattening the same between the pins as the lost motion is taken up between the crossheads and for folding the bag inwardly at the flattened portion as the crossheads reciprocate to force the air bag into a tire casing placed thereover.

8. An air bag inserter comprising a frame for supporting an air bag, upper and lower separately movable crossheads slidably mounted on the frame, a pin carried by each crosshead for folding the bag inwardly as the crossheads reciprocate upwardly to form the remainder thereof into a substantially annular shape, means for retracting the pin in the lower crosshead, and means to force the air bag into a tire casing placed thereover.

WILLIAM C. STEVENS.